United States Patent
Aneja et al.

(10) Patent No.: US 10,264,609 B2
(45) Date of Patent: Apr. 16, 2019

(54) METHOD AND SYSTEM FOR AD-HOC SOCIAL NETWORKING AND PROFILE MATCHING

(71) Applicants: Nagender Aneja, Delhi (IN); Sapna Gambhir, Faridabad (IN)

(72) Inventors: Nagender Aneja, Delhi (IN); Sapna Gambhir, Faridabad (IN)

(73) Assignees: Universiti Brunei Danssalam, Brunei Darussalam (BN); J.C. Bose University of Science and Technology, YMCA, Faridabad, Haryana (IN)

( * ) Notice: Subject to any disclaimer, the term of this patent is extended or adjusted under 35 U.S.C. 154(b) by 171 days.

(21) Appl. No.: 14/981,146

(22) Filed: Dec. 28, 2015

(65) Prior Publication Data

US 2016/0330773 A1    Nov. 10, 2016

(30) Foreign Application Priority Data

Sep. 29, 2015  (IN) .......................... 3105/DEL/2015

(51) Int. Cl.
| | |
|---|---|
| H04W 4/02 | (2018.01) |
| H04W 76/10 | (2018.01) |
| H04L 29/08 | (2006.01) |
| H04W 4/06 | (2009.01) |
| H04W 4/21 | (2018.01) |
| H04L 12/58 | (2006.01) |
| H04L 12/18 | (2006.01) |
| H04W 84/18 | (2009.01) |

(52) U.S. Cl.
CPC ......... *H04W 76/10* (2018.02); *H04L 12/1845* (2013.01); *H04L 51/14* (2013.01); *H04L 51/32* (2013.01); *H04L 67/22* (2013.01); *H04L 67/306* (2013.01); *H04W 4/02* (2013.01); *H04W 4/023* (2013.01); *H04W 4/06* (2013.01); *H04W 4/21* (2018.02); *H04W 84/18* (2013.01)

(58) Field of Classification Search
None
See application file for complete search history.

(56) References Cited

U.S. PATENT DOCUMENTS

| | | | | |
|---|---|---|---|---|
| 8,706,739 | B1* | 4/2014 | Song ................ | G06F 17/30867 707/748 |
| 2013/0073473 | A1* | 3/2013 | Heath ................ | G06Q 30/02 705/319 |
| 2013/0212176 | A1* | 8/2013 | Koulomzin ........ | G06Q 50/01 709/204 |
| 2013/0242805 | A1* | 9/2013 | Jung ................... | H04W 4/08 370/255 |
| 2013/0275513 | A1* | 10/2013 | Borovyk ............ | H04W 8/18 709/204 |
| 2014/0188866 | A1* | 7/2014 | Wu .................... | G06F 17/30867 707/732 |

(Continued)

*Primary Examiner* — Angel T Brockman

(57) ABSTRACT

Methods, systems, program products are described to create a social network based on dynamic interests of users and using ad-hoc networking. A user of mobile device can identify another user who is close by and has similar interests. Dynamic interests of the users can be extracted or identified based on mobile usage, browsing history, places traveled, and other user actions. Users are notified if another user who is similar more than a threshold is present nearby. The system also facilitates communication between users by way of chatting, file sharing, image sharing etc.

20 Claims, 4 Drawing Sheets

(56) References Cited

U.S. PATENT DOCUMENTS

| | | | | |
|---|---|---|---|---|
| 2014/0237051 A1* | 8/2014 | Abhyanker | ........ | G06Q 30/0261 709/204 |
| 2015/0006656 A1* | 1/2015 | Sinha | ...................... | H04L 67/12 709/206 |
| 2016/0092532 A1* | 3/2016 | Jia | ......................... | H04L 47/726 707/621 |

* cited by examiner

300
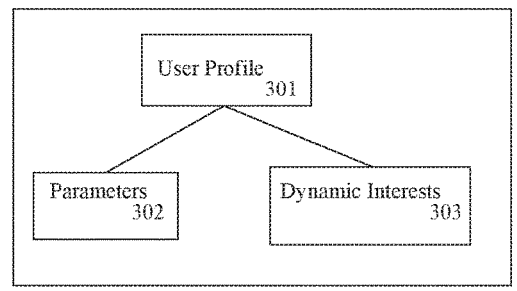
Figure 3A
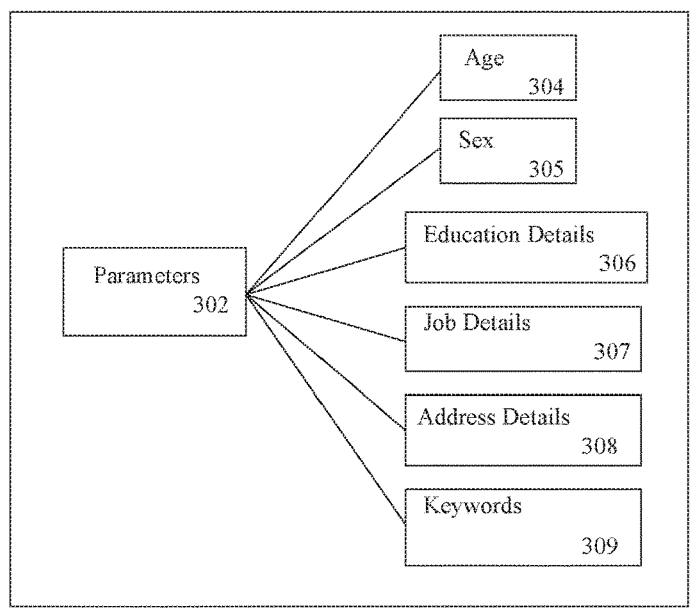
Figure 3B
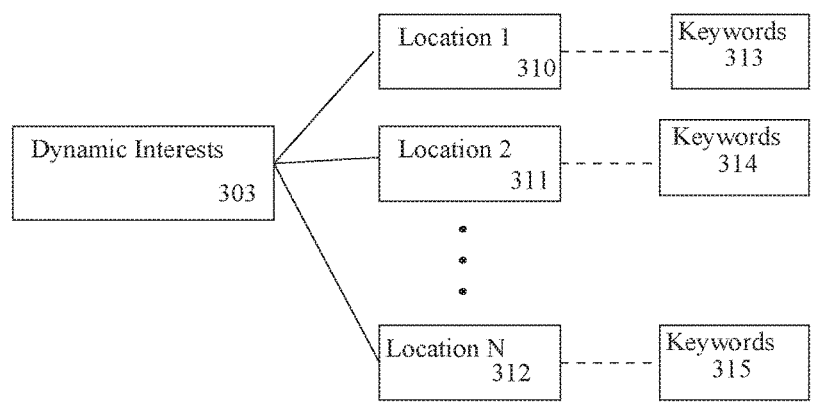
Figure 3C
FIG. 3

METHOD AND SYSTEM FOR AD-HOC SOCIAL NETWORKING AND PROFILE MATCHING

RELATED APPLICATION

This application claims the benefit of India Ordinary Application No. 3105/DEL/2015 filed on Sep. 29, 2015 and entitled "Ad-Hoc Social Networking and Profile Matching System", the content of which is incorporated in its entirety herein by reference.

TECHNICAL FIELD

This disclosure relates to location based social networking.

BACKGROUND

Today, mobile devices play an important role enabling people to access large variety of ubiquitous services and in particular social services. Usage of social services has increased significantly in recent years due to the different types of social applications and inexpensive Internet connectivity available on the mobile devices. Capabilities of Mobile Operating Systems e.g. Android, iOS, and Windows devices have improved significantly and data in the devices can now be shared faster without holding two phones together. For Example, Android 4.0 and later devices with particular hardware can be connected directly to each other via Wi-Fi peer-to-peer (P2P) technology without wireless access point. Wi-Fi Direct was also recently announced by Google from Android 4.0 to connect nearby devices at a range beyond the capabilities of Bluetooth and without requiring a wireless access point.

People now looking for new features in their mobile devices to create location based social networking using ad-hoc network. Ad-hoc social network provides a new type of service that is different from online social network service provided by current Facebook, Google+, Twitter, or others. Ad-hoc social network enables users to search friends to communicate and share contents which are of similar interest without the use of Internet. It provides an opportunity to meet unknown people with similar interest anytime anywhere.

BRIEF DESCRIPTION OF THE DRAWINGS

FIG. 3 describes structure of a user profile that is used to create ad-hoc social network.

DETAILED DESCRIPTION OF THE INVENTION

Specific language has been used to describe exemplary embodiments illustrated in drawings. Alterations and modifications of the described features, and additional applications of the embodiments, which would occur to one skilled in the relevant art and having possession of this disclosure, are to be considered within the scope of the description.

Figure 1:
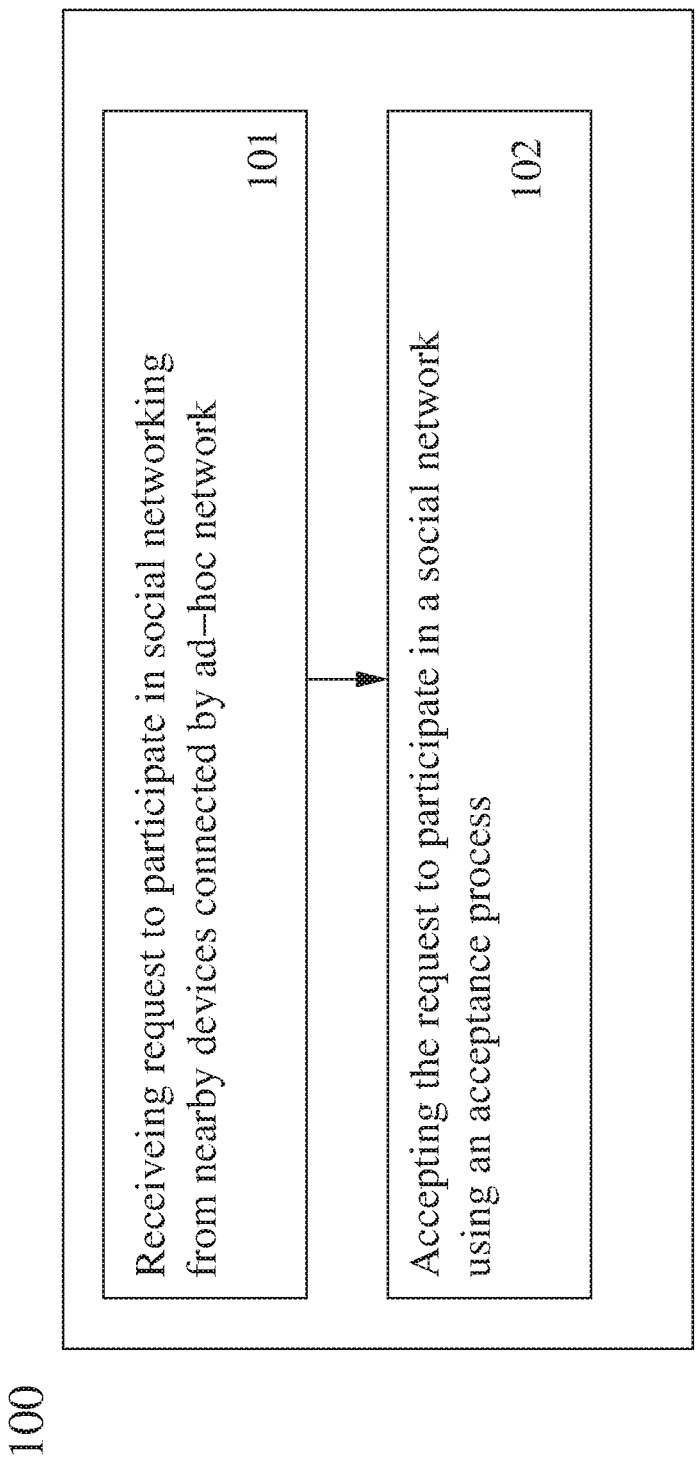
FIG. 1 is a flow chart describing process to connect a mobile device with another mobile device using ad-hoc social network.

FIG. 1 is a flow chart that describes the process to create an ad-hoc social network according to the present invention. An ad-hoc network or Peer-to-Peer network is a local area network that connects multiple devices without relying on a base station to coordinate flow of messages in the network. Nodes cooperate each other for forwarding the network packets. According to FIG. 1, a mobile node when receives a request from other nodes by step 101, accepts the request by step 102 by respective acceptance process. In one of embodiment, the acceptance process is to satisfy a criteria required by a user. The criteria for the acceptance process may include matching one or more user defined parameters, hobbies, or interests.

Figure 2:
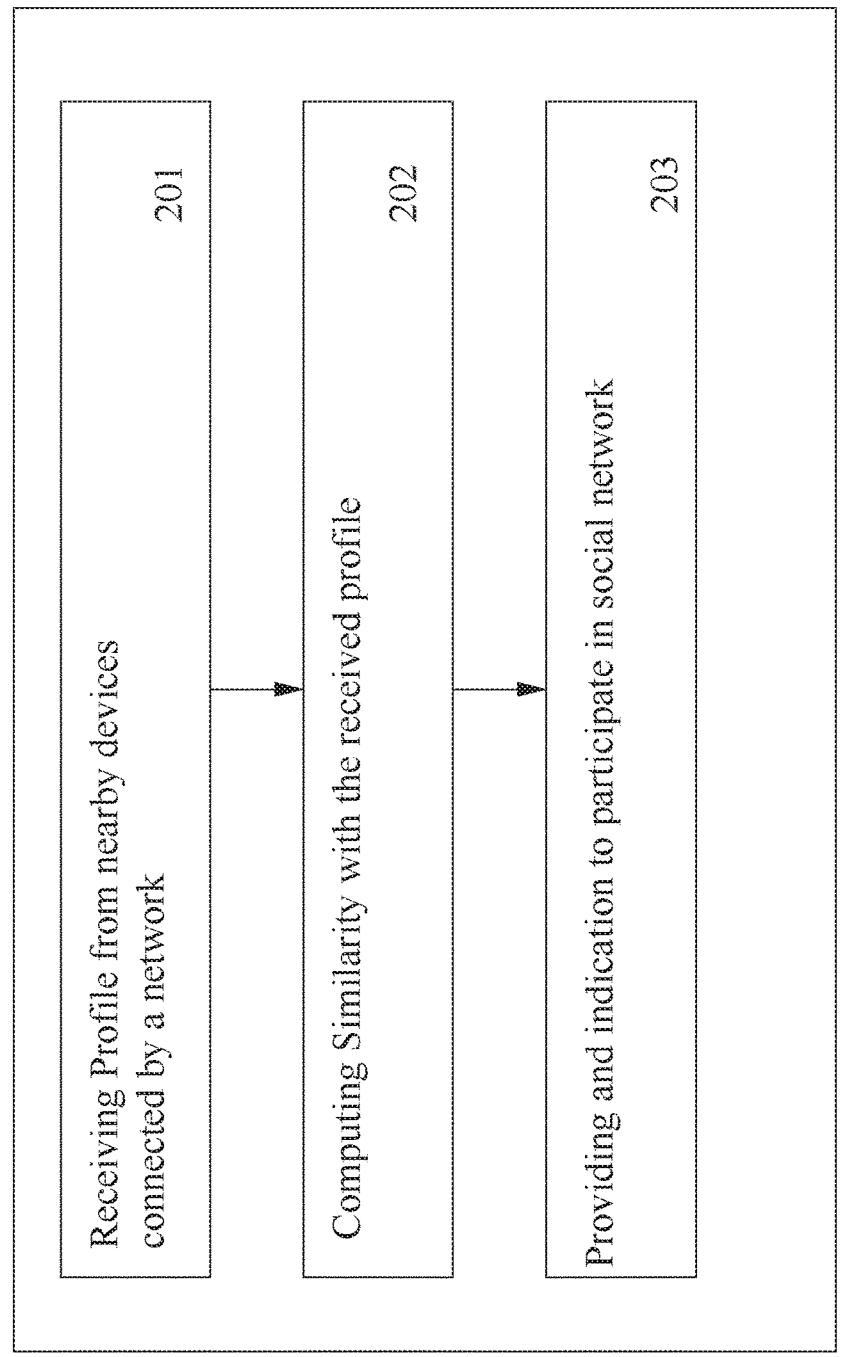
FIG. 2 is a flow chart describing process to connect a mobile device with another mobile device based on similar profiles.

According to FIG. 2, a mobile node receives profiles of one or more users by step 201 by wireless network. In one of embodiment, the profile includes users preferences and criteria that the mobile node is looking in other mobile nodes to be met completely or partially. The mobile node compute similarity of its own profile with the received one or more profiles by step 202. The mobile node provides indication by replying the received request by step 203 when similarity of the profiles is greater than the predefined threshold. In one of embodiment, the threshold is configured by a user as user preference. In one of embodiment, the threshold is configured by algorithm and is updated based on historical trends of as how threshold is helping users to find similar users. The algorithm lowers threshold if number of similar users are less and increases threshold if many similar users are suggested.

In one of embodiment, similarity of the profiles is calculated using cosine similarity.

According to present invention, FIG. 3 provides a description of user profile that is used to create ad-hoc social network in one of embodiment. A user profile 301 includes some parameters 302 and dynamic interests 303. Parameters 302 further includes but not limited to Age 304, Sex 305, education details 306, job details 307, address details 308, and other keywords 309.

In one of embodiment, the dynamic interests are provided by user of the mobile device or can be automatically extracted based on user behavior. In one of embodiment, user behavior includes search and browsing history. Dynamic interests are extracted from keywords used in the search and from accessed URLs of the links visited by the user.

In one of embodiment in according to present invention. FIG. 3 provides structure of dynamic interests 303. The dynamic interests are based on different locations. In one of the embodiment, location based interests are based on location based user behavior including location based search and browsing history. Keywords 313 are extracted and stored based on user behavior at Location 310. Similarly, keywords 314 are extracted based on user search and behavior at location 311 and keywords 315 are extracted based on user search and behavior at location 312.

In one of embodiment, the Keywords are time accumulated meaning whenever a user visits a location, the system activates the profile if already exists for that location or creates a new profile for that location if it is a new location. User profile of the location is updated based on user search and behavior for that location.

In one of the embodiment, the user has a global profile that is combination of all local profiles and is independent of location. Global profile is updated continuously based on user behavior at any location.

Figure 4:
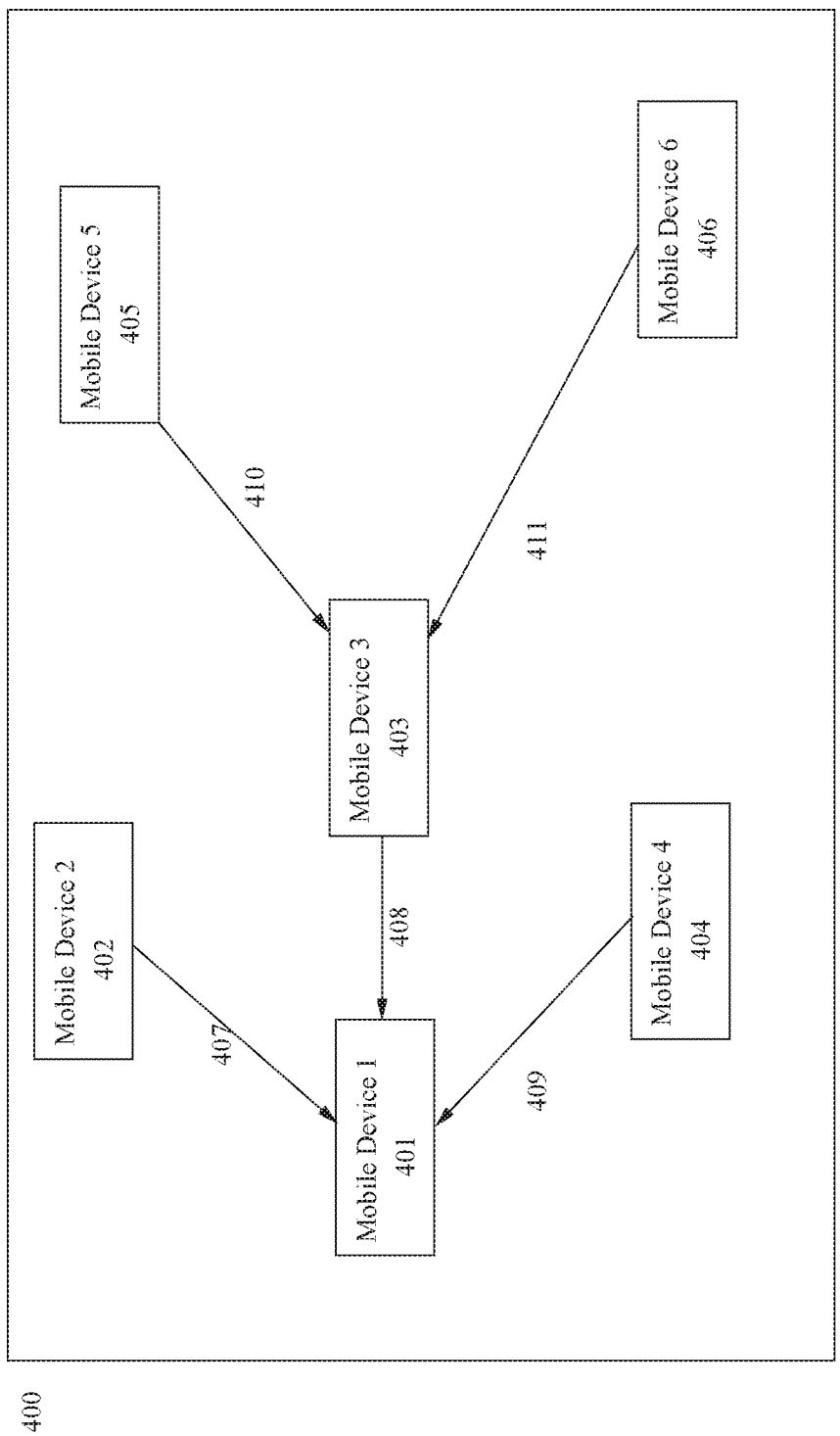
FIG. 4 is communication network for ad-hoc social network.

FIG. 4 describes communication system and network that is used in the present invention to create a social network using ad-hoc communication network. Ad-hoc communication network is a network in which nodes cooperate to forward network packets without any base station.

As an example to demonstrate, FIG. 4 includes a network 400 with exemplary mobile devices 401-406 that are part of the wireless network. In one of the embodiment, the ad-hoc social network is created by a request from one mobile device to another and consequent reply or acknowledgement from the other device based on the received request.

In one of embodiment, ad-hoc social network is established in two phases. Phase 1 is a preprocessing phase in which all nodes interested in the establishing ad-hoc social network broadcast their request, indication, or their profile. For example, as displayed in FIG. 4, mobile device 401 receives profile and other information from all nodes that can be connected with mobile device using ad-hoc network. Mobile device 401 receives user profiles from mobile devices 402-404 directly via paths 407-409 and from mobile devices 405-406 indirectly via mobile device 403 and via paths 410-411. Mobile device 403 further forwards profiles received from mobile devices 405 and 406 to mobile device 401 via path 408.

Once a mobile device receives a request from another mobile device, it decides if reply or acknowledgement should be sent to the other mobile device sending the request. In one of embodiment, the decision to send reply is made by an acceptance process based on similarity value and threshold required by the mobile device.

In one of embodiment, mobile device 401 computes similarity with the profiles received from other mobile devices before accepting the social connection request.

Some of embodiments described in the specification are labeled as steps or components in flowchart and drawings to demonstrate specific exemplary implementation. A step or component may be implemented as hardware circuit comprising customized semiconductors or other electronics components. A step or component may also be implemented in programmable hardware devices or software for execution by processors.

Software is an executable code that implements step or module and comprises of blocks of instructions organized in objects or functions. The blocks of instructions may be stored in different locations in a memory device and are joined at the time of execution.

The module or steps comprising of block of instructions may also be distributed over several memory or computing devices. Similarly, the data comprising of profiles or routing information may be stored at single location or may be distributed among several devices.

Features described in one or more embodiments may be combined in any suitable manner. A person of skilled in the art will recognize that the present invention can be practiced with other methods, components, devices, communication technology and not limited to ad-hoc communication technology.

The subject matter has been described in language specific to structural features and/or operations, however, it is to be understood that the subject matter defined in the claims is not necessarily limited to the specific features and operations. Specific features and modules described in the specification are disclosed as example forms of implementing the claims. Number of modifications and alternative arrangements can be devised without departing from the scope of the present invention.

Embodiments of the present invention may be implemented entirely in hardware components, entirely in software components, or combining both software and hardware aspects that may be referred as a "circuit," "step," "module" or "system." Embodiments of the present invention may also take the form of a computer program product that may include a computer readable storage media having computer readable program instructions thereon for causing a processor to carry out embodiments of the present invention.

The computer readable storage medium can be a tangible device that can retain and store instructions for use by execution device. The computer readable storage medium may be, but not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination.

A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

Embodiments of the present invention are described herein with reference to flowchart. It will be understood that each block of the flowchart illustrations and combinations of blocks in the flowchart illustrations can be implemented by computer readable program instructions.

What is claimed is:

1. A system, comprising:
    a processor;
    a profile module dynamically building a plurality of different profiles of a user based on user search and browsing history, wherein the plurality of different profiles of the user are built dynamically based on the user search and browsing history at a plurality of different locations only when the user visits at the plurality of different locations, at least one of the plurality of different profiles being used for creating a ad-hoc social network at one of the plurality of different locations without using a base station;
    a keyword extraction module automatically extracting a first set of keywords from a user search and browsing history at a first location to dynamically build a first profile for the first location and a second set of keywords from a user search and browsing history at a second location to dynamically build a second profile for the second location, wherein the first profile is dynamically built only at the first location based on the first set of keywords automatically extracted from the user search and browsing history at the first location only on a first visit to the first location, wherein the first profile is activated on a second visit to the first location, and is updated automatically at the first location based on information automatically extracted from user search and browsing history at the first location on the second visit to the first location, wherein the first profile built at the first location is different from the second profile built at the second location;

a profile broadcasting module broadcasting to a plurality of nodes without using a base station, one of the plurality of different profiles to indicate interest in creating the ad-hoc social network, the one of the plurality of different profiles being only the first profile when broadcasting from the first location and only the second profile when broadcasting from the second location and a global profile which is a combination of all the plurality of different profiles dynamically built for the plurality of different locations where the user has visited at least once when broadcasting at any other location for which there is no user profile created and where the user has not visited; and in response to the broadcasting, a social networking module, receiving without using the base station, an indication from another user to participate in the ad-hoc social network when a similarity of the user profile broadcasted by the user with a profile of the another user is greater than a threshold, wherein the threshold is configured to be automatically updated based only historical trends of identifying similar users based on the threshold, wherein the threshold automatically decreases based on a decrease in number of the similar users identified based on the predefined threshold.

2. The system of claim 1, wherein the social networking module receiving the indication comprising of the profile of the another user.

3. The system of claim 1, wherein the keyword extraction module extracting at least one of the first set of keywords from keywords used in search and from accessed URLs of links visited by the user at the first location and the second set of keywords from keywords used in search and from accessed URLs of links visited by the user at the second location, wherein the first set of keywords includes one or more keywords accumulated over a time period based on keywords used in search and accessed URLs of links visited by the user during subsequent visits of the user at the first location over the time period.

4. The system of claim 1, wherein the keyword extraction module extracting at least one of the first set of keywords or the second set of keywords comprising parsing keywords being used to search information.

5. The system of claim 1, wherein the keyword extraction module extracting at least one of the first set of keywords or the second set of keywords comprising parsing keywords in urls being visited to search information.

6. The system of claim 1 further comprising, wherein the keyword extraction module extracting at least one of the first set of keywords or the second set of keywords comprising parsing content of webpage being displayed on the mobile device.

7. The system of claim 1, wherein the global profile is updated continuously at a user device based on the user search and browsing history at all the plurality of different locations.

8. The system of claim of 1, wherein the global profile of the user is independent of the user location.

9. The system of claim 1, wherein the threshold configured to be is updated based on one or more inputs from the user.

10. The system of claim 1, wherein the similarity is calculated using cosine similarity.

11. A non-transitory computer-readable storage medium having computer-executable instructions embodied thereon and, when executed by a processor, causes the processor to perform operations comprising:

building a plurality of different profiles of a user based only user search and browsing history at a plurality of different locations, wherein each of the plurality of different profiles of the user is built at only one of the plurality of different locations only during a first visit of the user to the one of the plurality of different locations, the plurality of different profiles being used for creating an ad-hoc social network without relying on a base station, the building the plurality of different profiles comprising:

automatically extracting a first set of keywords only from a user search and browsing history of the user during a first visit a first location to build a first profile of the user for the first location, wherein the first profile is activated at least when the first profile already exists and the user makes a second visit at the first location, the first profile is updated automatically based on only one or more keywords automatically extracted from a user search and browsing history of the user during the second visit at the first location; and automatically extracting a second set of keywords only from a user search and browsing history of the user during a first visit at a second location to build a second profile for the second location, wherein the second profile is activated at least when the user makes a second visit at the second location and the second profile is updated automatically based on only one or more keywords extracted automatically from a user search and browsing history of the user during the second visit at the second location;

broadcasting one of the plurality of different profiles without relying on the base station to indicate interest in creating the ad-hoc social network, the one of the plurality of different profiles being only the first profile when broadcasting at the first location and only the second profile when broadcasting at the second location and a third profile built based on a combination of the first profile and the second profile when broadcasting at a third location for which there is no user profile, the third profile is independent of the third location and s updated continuously based on the user search and browsing history at the first location and the second location; and in response to the broadcasting, receiving a plurality of indications, without relying on the base station, from other users to participate in social networking only when a similarity of profiles of the other users with one of the first profile for the first location, the second profile for the second location and the third profile for the third location is greater than a threshold, the threshold being updated based on only historical trends of finding similar users.

12. The non-transitory computer-readable storage medium of claim 11, wherein the plurality of locations are considered different locations for building the plurality of profiles when a distance between two locations is greater than a predetermined threshold.

13. The non-transitory computer-readable storage medium of claim 11, wherein the plurality of indications further comprises a plurality of profiles of the other users that sent the indications based on the received broadcasted profile, wherein the plurality of profile of the other users comprise a first set of profiles received indirectly via an intermediate mobile device without relying on the base station and a second set of profiles received directly without relying on the base station.

14. An electronic-device implemented method to connect a first mobile device with a second mobile device, the method comprising:

receiving a first request at the first mobile device to participate in a first ad-hoc social network, wherein the first request comprising a profile which is a combination of a plurality of location dependent profiles, the first request being received, without relying on a base station, only indirectly via an intermediate mobile device of the ad-hoc network between the first mobile device and the second mobile device, receiving a second request at the first mobile device to participate in a second ad-hoc social network from a third mobile device directly without using the base station;

accepting the first request to participate in the first ad-hoc social network, the first request being accepted using an acceptance process, wherein the acceptance process comprising providing information to the second device via the intermediate mobile device without using the base station, wherein the acceptance process comprising computing a similarity value based on similarity of profiles, the similarity value being greater than a predefined threshold value required by the first mobile device, the predefined threshold value being configured only based on historical trends of identifying similar users using the predefined threshold, wherein the predefined threshold varies with a number of similar users identified; and sharing, without relying on the base station via the intermediate mobile device, at least of one of text, image, file, audio, and video from the first mobile device to the second mobile device using the ad-hoc network.

15. The electronic-device implemented method of claim 14, wherein the profile is based on dynamic interests of a user, wherein the dynamic interests are automatically extracted only based on keywords used in search and from accessed URLs of links visited by the user at a location.

16. The electronic-device implemented method of claim 15, further comprising computing one or more classification category of the dynamic interests based on one or more keywords present in the profile.

17. The electronic-device implemented method of claim 16, wherein the computing similarity of profiles comprises matching the one or more classification categories of the profile of the user with the one or more classification categories of the profile of another user.

18. The electronic-device implemented method of claim 14, wherein the profile comprising of one or more keywords representing a user.

19. The electronic-device implemented method of claim 14, wherein the profile comprising of one or more keywords extracted from user search and browsing behavior.

20. The electronic-device implemented method of claim 14, wherein the computing similarity of profiles comprising of matching one of more keywords of one profile with matching one or more keywords of another profile.

* * * * *